US010173740B2

(12) United States Patent
Yeh

(10) Patent No.: US 10,173,740 B2
(45) Date of Patent: Jan. 8, 2019

(54) BICYCLE CONTAINER

(71) Applicant: GAUSS INNOVATION DESIGN CO., Hsinchu County (TW)

(72) Inventor: Shih-Lin Yeh, Hsinchu County (TW)

(73) Assignee: GAUSS INNOVATION DESIGN CO., Zhubei, Hsinchu County (TW)

( * ) Notice: Subject to any disclaimer, the term of this patent is extended or adjusted under 35 U.S.C. 154(b) by 37 days.

(21) Appl. No.: 15/424,617

(22) Filed: Feb. 3, 2017

(65) Prior Publication Data
US 2017/0225730 A1 Aug. 10, 2017

(30) Foreign Application Priority Data

Feb. 4, 2016 (TW) .............................. 105103765 A
Apr. 6, 2016 (TW) .............................. 105110734 A
Jun. 1, 2016 (TW) .............................. 105117155 A

(51) Int. Cl.
*B62H 1/08* (2006.01)
*B65D 23/00* (2006.01)
*B62J 11/00* (2006.01)

(52) U.S. Cl.
CPC ................ *B62H 1/08* (2013.01); *B62J 11/00* (2013.01); *B65D 23/00* (2013.01)

(58) Field of Classification Search
CPC ..... B62H 1/08; B62H 2700/005; B65D 23/00
USPC ........................... 224/414; D12/411; 215/383
See application file for complete search history.

(56) References Cited

U.S. PATENT DOCUMENTS

| 3,920,140 | A | * | 11/1975 | Kiser | B62J 11/00 215/399 |
| 4,176,770 | A | * | 12/1979 | Griggs | B62J 11/00 215/383 |
| 4,368,827 | A | * | 1/1983 | Thompson | B29C 49/54 215/398 |
| 4,605,242 | A | * | 8/1986 | Kimball | B62H 1/08 280/294 |
| D356,542 | S | * | 3/1995 | Finkiewicz | D12/411 |
| 5,484,128 | A | * | 1/1996 | Franco, Sr. | B62J 11/00 224/274 |
| 5,624,064 | A | * | 4/1997 | McGee, Jr. | B62J 11/00 215/373 |

(Continued)

FOREIGN PATENT DOCUMENTS

| CN | 202345814 U | 7/2010 |
| CN | 101823527 A | 9/2010 |

(Continued)

OTHER PUBLICATIONS

Anzacycling.Rti.Ed@gmail.com; "How to stand your bike up without defiling i t : Round The Island"; Feb. 27, 2015; pp. 1-3; Retrieved from the Internet: URL: https://cyclingrti.wordpress.com/2015/ 02/27/how-to-stand-your-bike-up-without-defiling-it/ [retrieved on 2017—Jun. 1, 2017].

*Primary Examiner* — Justin Larson
(74) *Attorney, Agent, or Firm* — Muncy, Geissler, Olds & Lowe, P.C.

(57) ABSTRACT

A bicycle container including a main body for containing objects and an engagement member provided on the main body. The engagement member is configured to engage with a pedal of a bicycle to enable the bicycle container to be detachably coupled to the pedal to hold the bicycle in an uptight position.

11 Claims, 14 Drawing Sheets

(56) References Cited

U.S. PATENT DOCUMENTS

| | | | | | |
|---|---|---|---|---|---|
| 5,704,525 | A | * | 1/1998 | Barro | B62J 11/00 224/414 |
| 5,887,774 | A | * | 3/1999 | Bethune | B60R 7/08 215/383 |
| 6,273,283 | B1 | * | 8/2001 | Terrana | A45F 3/16 215/383 |
| 8,602,278 | B2 | * | 12/2013 | Sweigart | B62J 11/00 224/148.4 |
| 8,814,063 | B1 | * | 8/2014 | Millan | A45F 3/18 239/289 |
| 9,084,468 | B2 | * | 7/2015 | Conwell | A45F 5/00 |
| D801,816 | S | * | 11/2017 | Garcia | D9/519 |
| 2006/0169423 | A1 | * | 8/2006 | Chuang | B62H 3/00 160/180 |
| 2008/0149589 | A1 | * | 6/2008 | Lach | A45F 3/16 215/386 |
| 2017/0225730 | A1 | * | 8/2017 | Yeh | B62H 1/08 |

FOREIGN PATENT DOCUMENTS

| | | |
|---|---|---|
| DE | 102005006165 A1 | 8/2006 |
| JP | 2002154465 A | 5/2002 |
| JP | 2010126152 A | 6/2010 |
| TW | M292525 U | 6/2006 |
| TW | M353890 U | 4/2009 |
| TW | M369892 U | 12/2009 |
| TW | I370072 B | 8/2012 |
| TW | I379786 B | 12/2012 |
| TW | I503249 B | 10/2015 |

* cited by examiner

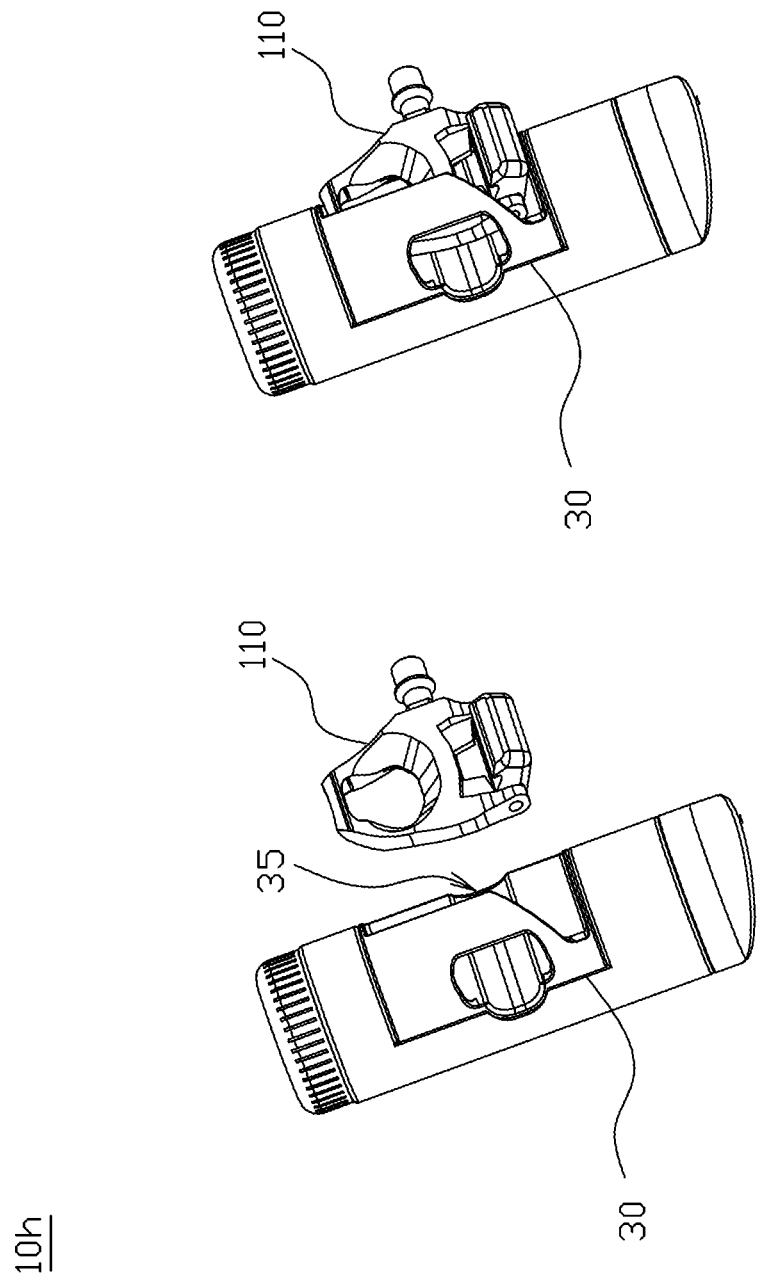

BICYCLE CONTAINER

BACKGROUND OF THE INVENTION a. Field of the Invention

The invention relates a bicycle container for containing objects and functioning as a bicycle stand.

b. Description of the Related Art

It is often desired by users of bicycles to hold their bicycles upright and stable when not in use. Many bicycles may not come with kickstands for holding the bicycle upright, and thus the users may need to carry a bicycle stand. This is inconvenient for bicycle users. Therefore, it is desirable to provide a bicycle accessory that can be also function as a bicycle stand.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention are acknowledged by a person of ordinary skill in the art.

BRIEF SUMMARY OF THE INVENTION

The invention provides a bicycle container for containing objects and functioning as a bicycle stand.

Other objects and advantages of the invention may be further illustrated by the technical features broadly embodied and described as follows.

In order to achieve one or a portion of or all of the objects or other objects, one embodiment of the invention provides a bicycle container including a main body for containing objects and an engagement member provided on the main body. The engagement member is configured to engage with a pedal of a bicycle to enable the bicycle container to be detachably coupled to the pedal to hold the bicycle in an uptight position.

In another embodiment, a bicycle container includes a main body for containing objects and an engagement member. The main body has a side wall and a bottom surface connected to the side wall, and the engagement member provided on the sidewall of the main body to engage with a pedal. The pedal engaged with the bicycle container exerts a force on the bicycle container through at least one point, and the at least one point overlaps the bottom surface.

In another embodiment, a bicycle container includes a main body for containing objects and an engagement member. The main body has a side wall and a bottom surface connected to the side wall, and the engagement member is provided on the sidewall of the main body to engage with a pedal to enable the bicycle container to be detachably coupled to the pedal to hold the bicycle in an uptight position. At least a part of the bottom surface touches the ground to support the pedal, and the side wall obliquely stands on the ground.

According to the above embodiment, portable containers used as bicycle accessories, such as a bicycle kettle or a tool bottle, may also function as a bicycle stand simply by modifying partial container structure to form an engagement member that enables a bicycle container to be detachably coupled to a pedal. Therefore, a separate bicycle stand carried by a bicycle rider is no longer needed. Further, when the bicycle is not in the parked state, the bicycle container may be quickly detached from the pedal and may return to a position according to its original purposes; for example, a bicycle kettle may be fixed on a bicycle tube and a tool bottle may be fixed on a stem to serve their inherent functions of containing objects. Besides, the configuration of a bicycle container is favorable for providing stable support on the ground and thus suitable for supporting the pedal. Further, since the bicycle container is a common bicycle accessory usually carried on a bicycle, the bicycle container also functioning as a bicycle stand would not occupied additional space and increase additional weight and needs not to be locked on the bicycle. This may enhance the convenience for parking a bicycle and the flexibility in the utilization of a bicycle accessory.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 14 shows a schematic diagram illustrating a bicycle container coupled to a pedal according to another embodiment of the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1B:
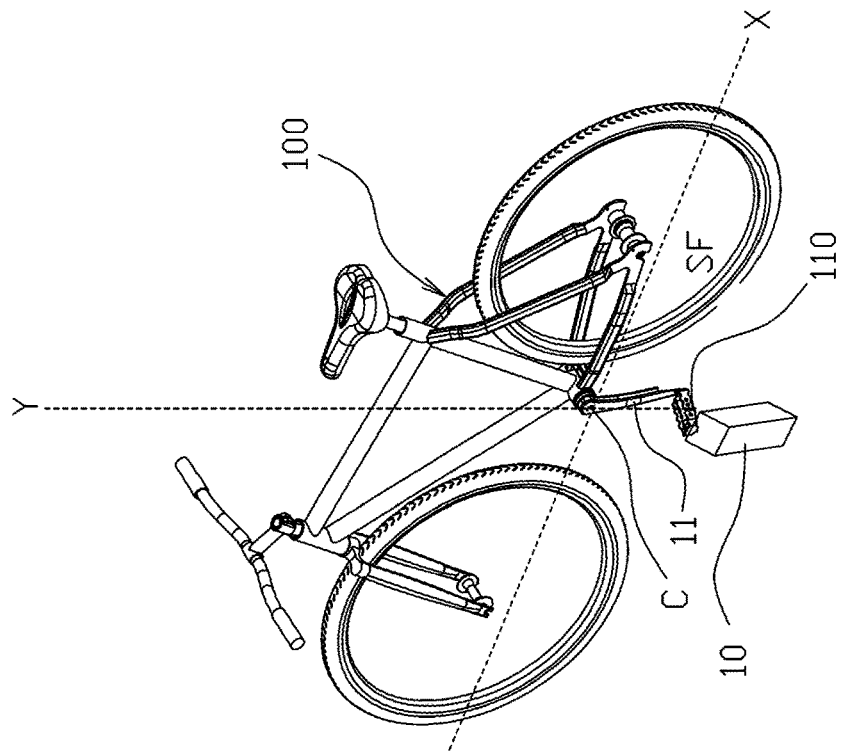
FIG. 1A and FIG. 1B show schematic diagrams of a bicycle container functioning as a bicycle stand according to an embodiment of the invention.
Figure 1A:
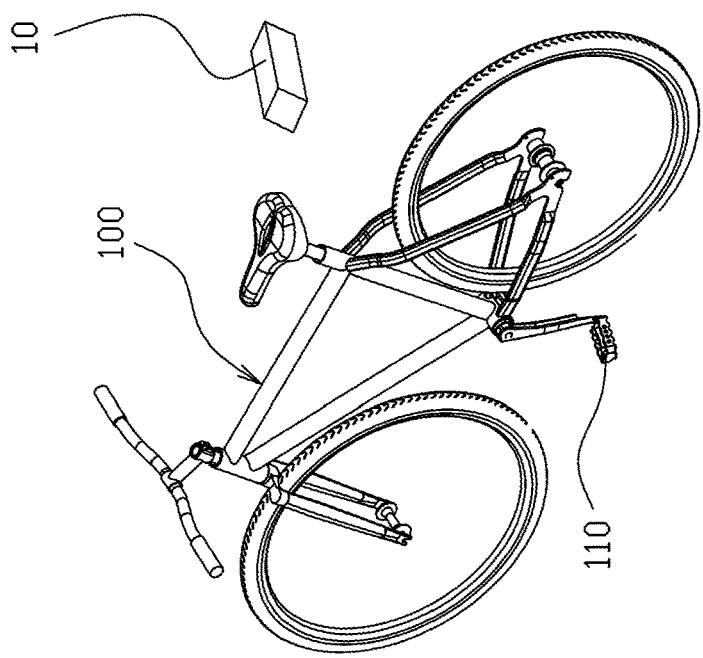

FIG. 1A and FIG. 1B show schematic diagrams of a bicycle container functioning as a bicycle stand according to an embodiment of the invention. A bicycle container 10 may include, but not limited to, a bicycle kettle, a bike water bottle, a tool bottle, or a kettle-shaped tool bag. As shown in FIG. 1B, a bicycle container 10 may be coupled to a pedal 110 of a bicycle 100 to hold the bicycle 100 in an upright position.

Figure 2:
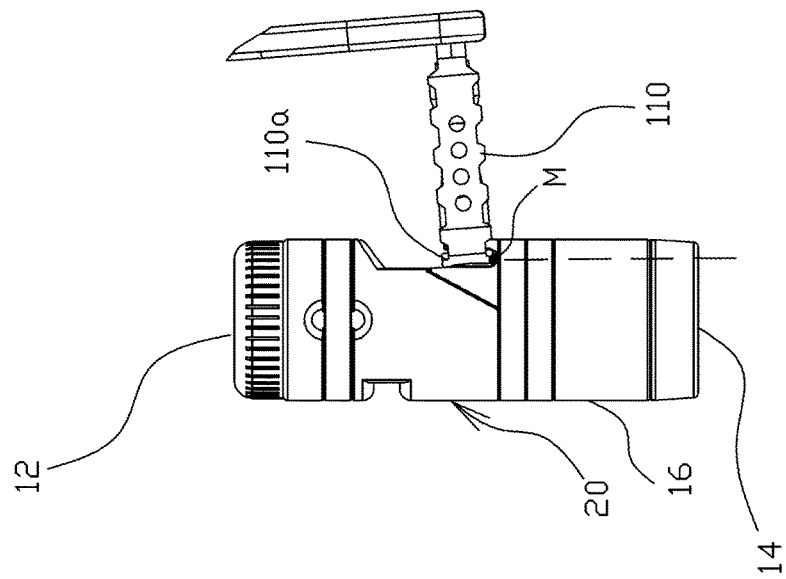
FIG. 2 shows a schematic diagram illustrating a bicycle container coupled to a pedal according to an embodiment of the invention.
Figure 2:
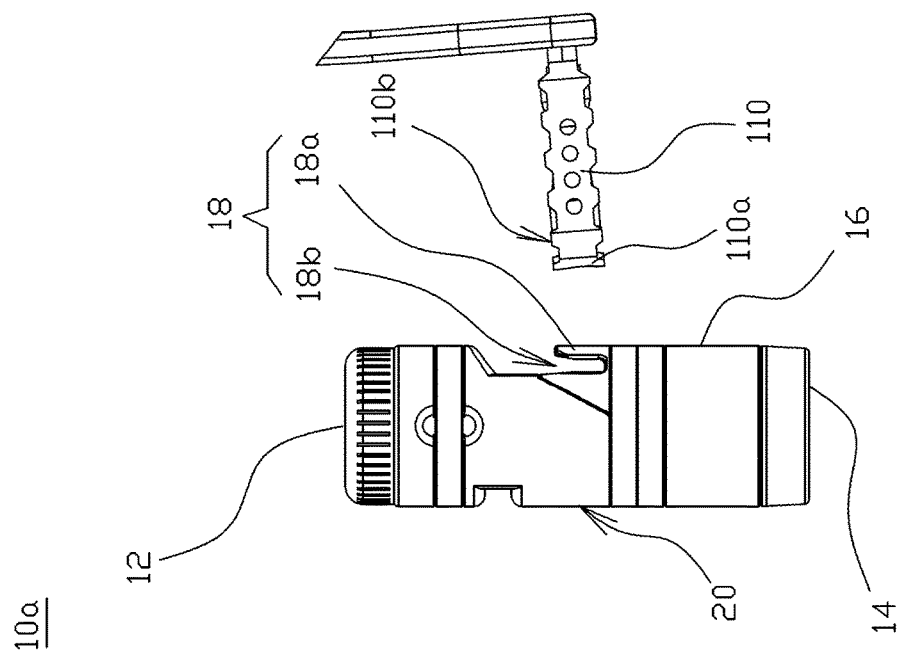

FIG. 2 shows a schematic diagram illustrating a bicycle container coupled to a pedal according to an embodiment of the invention. In this embodiment, the bicycle container 10a has a main body 20 for containing objects, such as water, beverage or tool, and an engagement member 18 is provided on the main body 20. The main body 20 has a top portion 12, a bottom portion 14, and a side wall 16 connected between the top portion 12 and the bottom portion 14. A hook structure 18a is provided on the side wall 16, and a depression 18b is formed adjacent to the hook structure 18a and concave towards the inside of the main body 20. The hook structure 18a cooperates with the depression 18b to form the engagement member 18. The pedal 110 is not limited to a specific type, in this embodiment, the pedal 110 may have a side end 110a and at least one opening 110b beside the side end 110a. When the bicycle 100 is in a parked state and hold in an upright position, one side of the pedal 110 may engage in the engagement member 18 to quickly couple the pedal 110 with the bicycle container 10a. For example, the hook structure 18a on the side wall 16 may be inserted in the opening 110b of the pedal 110 and stay in the depression 18b to achieve the engagement.

According to the embodiments of the invention, portable containers used as bicycle accessories, such as a bicycle kettle or a tool bottle, may also function as a bicycle stand simply by modifying partial container structure to form an engagement member that enables a bicycle container to be detachably coupled to a pedal. Therefore, a separate bicycle stand carried by a bicycle rider is no longer needed. Further, when the bicycle is not in the parked state, the bicycle container may be quickly detached from the pedal and return to a position according to its original purposes; for example, a bicycle kettle or water bottle may be fixed on a bicycle tube and a tool bottle may be fixed on a stem to serve their inherent functions of containing objects. Besides, the configuration of a bicycle container is favorable for providing stable support on the ground and thus suitable for supporting the pedal. Further, since the bicycle container is a common bicycle accessory usually carried on a bicycle, the bicycle container also functioning as a bicycle stand would not occupied additional space and increase additional weight and needs not to be locked on the bicycle. This may enhance the convenience for parking a bicycle and the flexibility in the utilization of a bicycle accessory.

Figure 3:
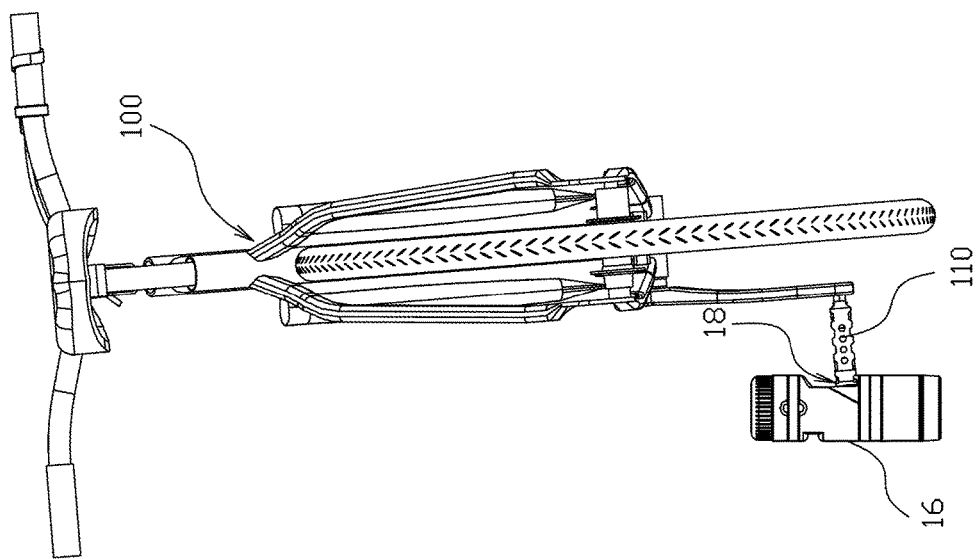
FIG. 3 shows a schematic diagram illustrating a bicycle container for holding a bicycle upright according to an embodiment of the invention.

Please refer to FIG. 2 again, in this embodiment, when the bicycle is hold in an upright position, the pedal 110 may grip the hook structure 18a, and the side end 110a of the pedal 110 stay in the depression 18b that is concave towards the inside of the bicycle container 10a. Therefore, the side end 110a of the pedal 110 may exert a force towards the inside of the bicycle container 10a through at least one point M. As shown in FIG. 2, a vertically extension dashed line passing through the point M may cross the bottom portion 14, which indicates the force exerted by the pedal 110 through the point M is applied to the inside of the bicycle container 10a (within the bottom portion 14) but not outside of the bicycle container 10a to further prevent the bicycle container 10a from overturning and increase the stability of a parked state of the bicycle 100, as shown in FIG. 3.

According to various embodiments of the invention, since the engagement member is used to mate a pedal rather than a complex fixed mount or slidable mount, the bicycle container may be easily and quickly coupled to a pedal simply by modifying its partial structure. Therefore, the formation of a parking mechanism for a bicycle can be simplified. Besides, since the insertion object mated with the engagement member is a pedal, the force exerted by the pedal may be applied to the inside of the bicycle container to further improve the stability of a parked state of a bicycle.

Figure 4:
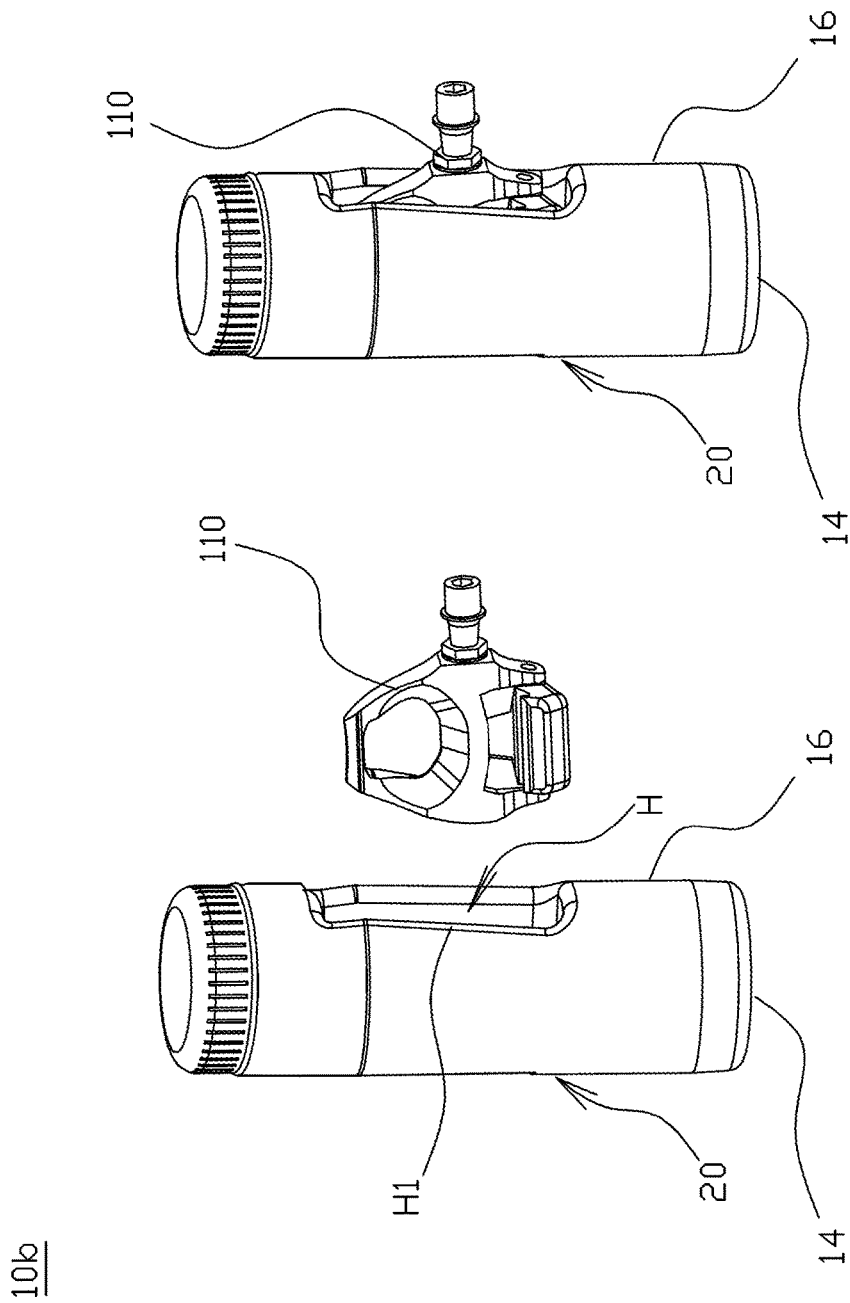
FIG. 4 shows a schematic diagram illustrating a bicycle container coupled to a pedal according to another embodiment of the invention.

FIG. 4 shows a schematic diagram illustrating a bicycle container coupled to a pedal according to another embodiment of the invention. As shown in FIG. 4, in this embodiment, a hole H is formed in the main body 20 of a bicycle container 10b, and the pedal 110 is inserted into the hole H to allow the bicycle container 10b to function as a bicycle stand. When the bicycle is not in a parked state, the pedal 110 is detached from the bicycle container 10b, and the bicycle container 10b can be taken out. According to the above embodiment, a hole H may fit the pedal 110 quickly to allow the bicycle container 10b to achieve both functions of containing objects and holding a bicycle upright. Since the hole H and the pedal 110 can be fit neatly, the pedal 110 is not liable to slip off the hole H, and the hole H may evenly and stably support the pedal 110. Besides, since the hole H may be formed in the inside of the bicycle container 10b, the pedal 110 may engage in the bicycle container 10b in a position inside the bicycle container 10b, and thus the force exerted by the pedal 110 is applied to the inside of the bicycle container 10b but not outside of the bicycle container 10b to further increase the stability of a parked state of a bicycle.

Figure 5C:
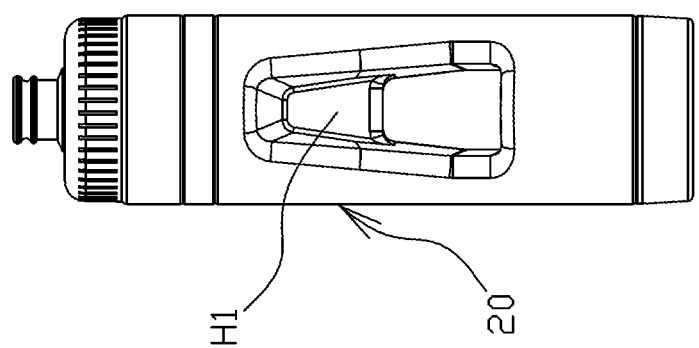
FIGS. 5A-5C shows schematic diagrams of a bicycle container viewing in different directions according to another embodiment of the invention.
Figure 5B:
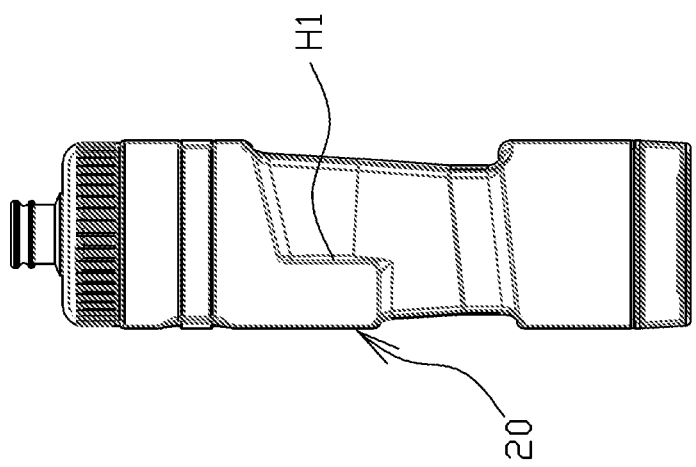
Figure 5A:
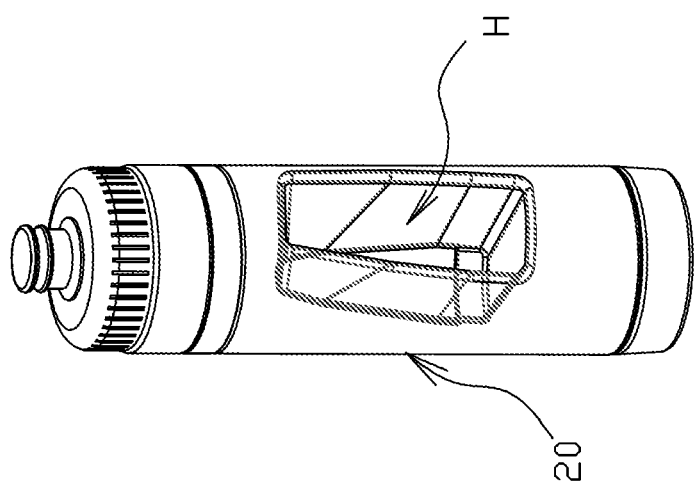
Figure 6:
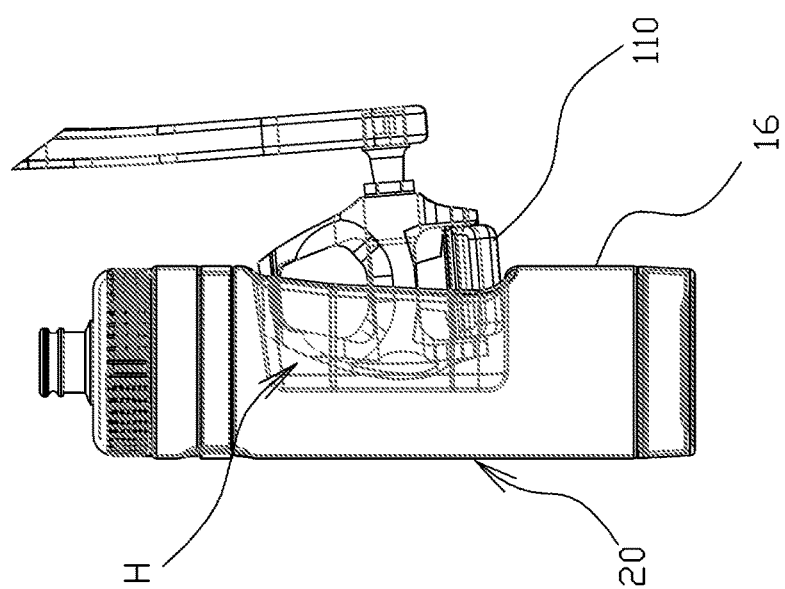
FIG. 6 shows a schematic diagram illustrating a bicycle container coupled to a pedal according to another embodiment of the invention.

In various embodiments of the invention, the shape, size and formation of the hole H are not limited and may arbitrary vary to fit various types of pedals. FIGS. 5A-5C shows schematic diagrams of a bicycle container viewing from different directions according to another embodiment of the invention. As shown in FIGS. 5A-5C, the hole H is a through hole and a baffle plate H1 may be disposed beside the through hole H to prevent the pedal 110 from being excessively inserted into the hole H exceeding the depth of the hole H. In an alternate embodiment, a resilient material or other cushion member may be used to provide an aid to fix the pedal 110. Further, the hole H may have a variable size that varies along with the insertion extent of the pedal 110, namely varying along with the entrance to the inside of the hole H, to fit various types and sizes of a pedal 110. For example, as shown in FIG. 6, the hole H may be a blind hole that is continuously reduced in size along with the insertion extent of the pedal 110; that is, the size of the hole H is gradually decreased from the side wall 16 to the inside of the main body 20 of a bicycle container. Besides, the hole H may have a shape corresponding to the shape of the pedal 110 to fit more neatly with the pedal 110 and make a tight fit between the hole H and the pedal 110 to reduce the chance of slipping off the hole H.

Figure 7B:
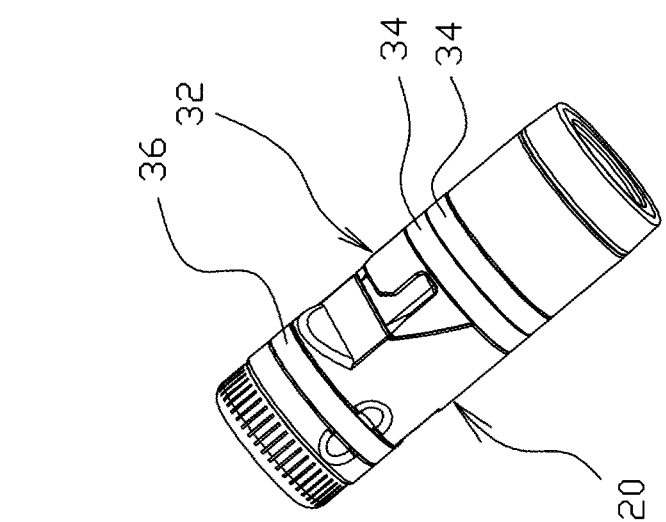
FIGS. 7A and 7B show schematic diagrams of a bicycle container according to another embodiment of the invention.
Figure 7A:
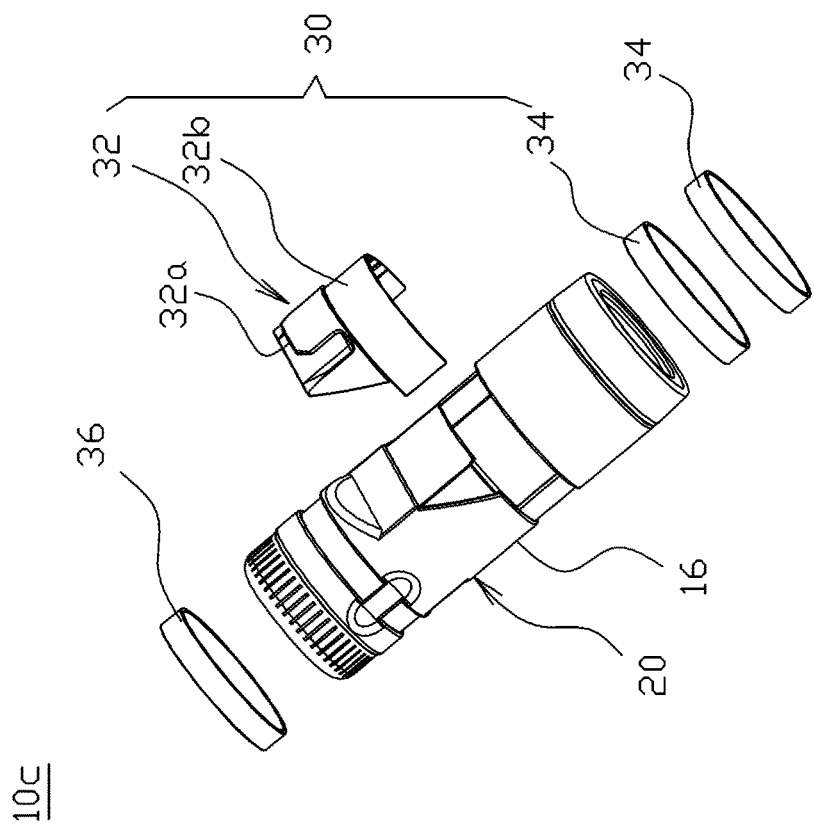
Figure 8:
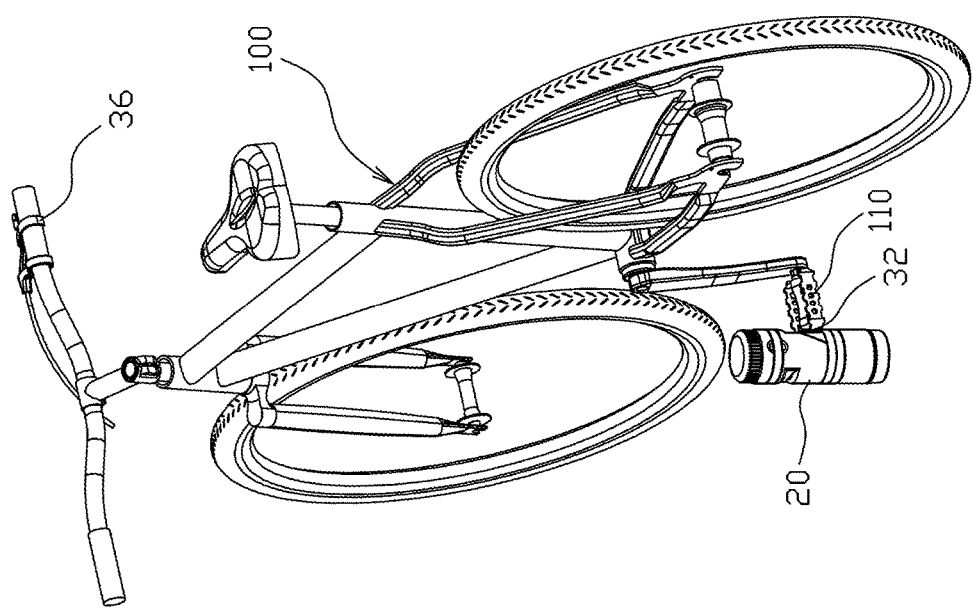
FIG. 8 shows a schematic diagram illustrating a bicycle container for holding a bicycle upright according to another embodiment of the invention.
Figure 9B:
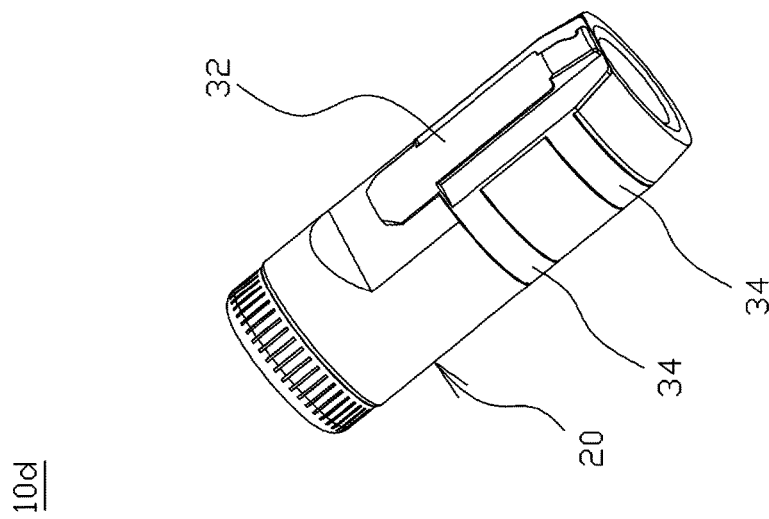
FIGS. 9A and 9B show schematic diagrams of a bicycle container according to another embodiment of the invention.
Figure 9A:
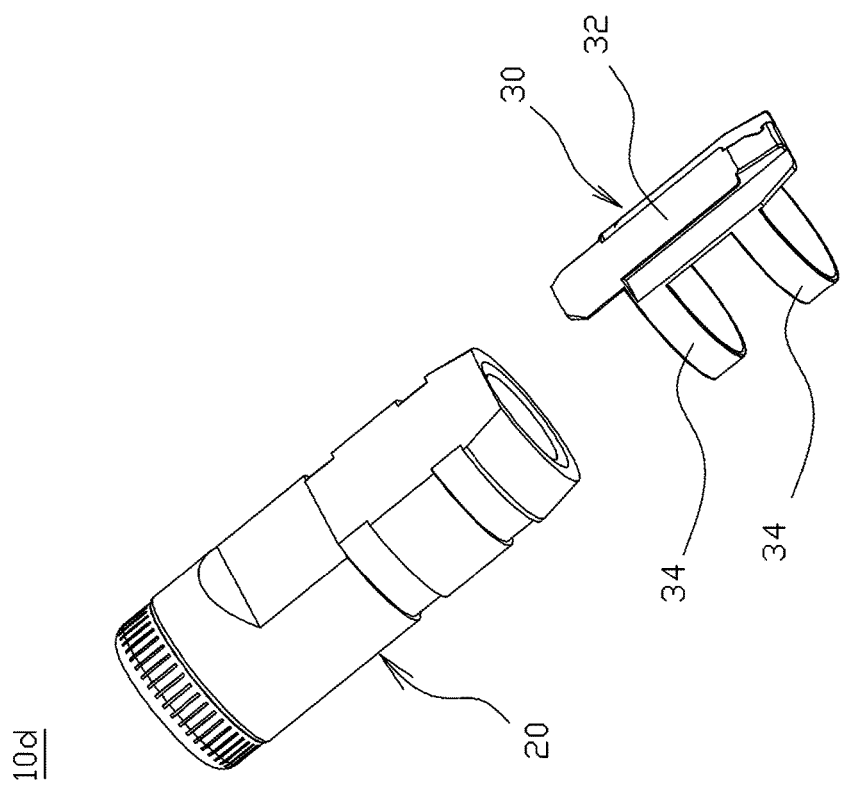

FIGS. 7A and 7B show schematic diagrams of a bicycle container according to another embodiment of the invention. As shown in FIGS. 7A and 7B, the bicycle container 10c has a main body 20 and an engagement member 30. In this embodiment, the engagement member 30 may include multiple pieces, such as a hook member 32 and at least one annular ring 34. The hook member 32 may have a hook portion 32a and a mounting portion 32b, the annular ring 34 is inserted onto the main body 20 to fix the mounting portion 32b on the main body 20 to allow the hook member 32 to be attached to the main body 20. Besides, at least one of the annular ring 34 may function as an auxiliary brake ring 36 that may be put on the main body 20 for convenient uses. When the bicycle 100 is hold in an upright position, as shown in FIG. 8, the pedal 110 may engage with the hook member 32 to be detachably coupled to the bicycle container 10c, and the auxiliary brake ring 36 may clamp a front/rear wheel brake lever of the bicycle 100 to lock a front/rear wheel to some extent, thus helping to prevent sliding of a parked bicycle 100. When the bicycle 100 is not in a parked state, the auxiliary brake ring 36 may be taken off and put on the main body 20 or fixed on any position of the bicycle 100. In one embodiment, the auxiliary brake ring 36 and the annular ring 34 may have an identical shape and size to simplify fabrication processes. In this embodiment, the engagement member 30 is divided into multiple pieces to simplify fabrication processes and allow the engagement member 30 to be easily mounted on the main body 20. In an alternate embodiment shown in FIGS. 9A and 9B, the hook member 32 and the annular rings 34 may be integrally formed as one piece first and then put on the main body 20 to form a bicycle container 10d functioning as a bicycle stand.

Figure 10A:
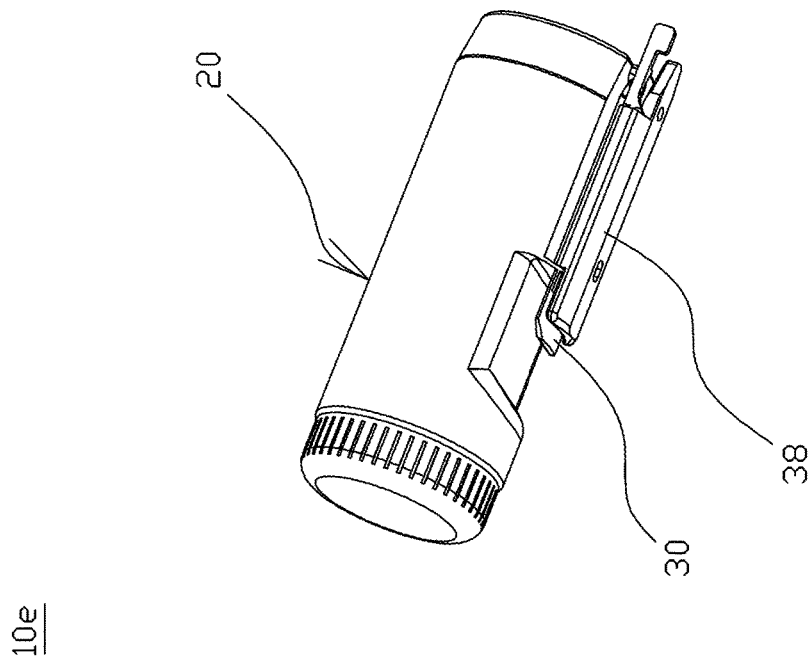
FIGS. 10A and 10B show schematic diagrams of a bicycle container according to another embodiment of the invention.
Figure 10B:
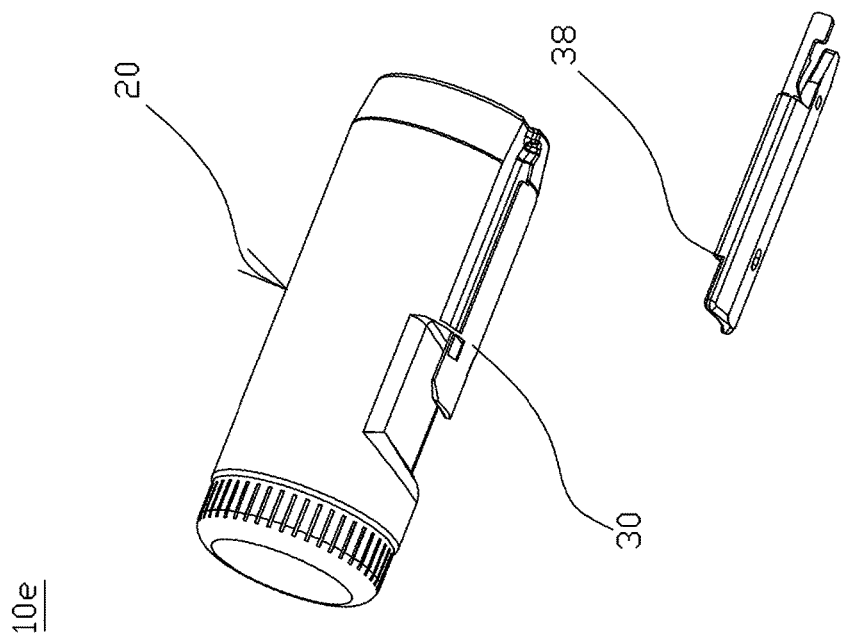

FIGS. 10A and 10B show schematic diagrams of a bicycle container according to another embodiment of the invention. The bicycle container 10e includes a main body 20, an engagement member 30 and a detachable sub piece 38. The detachable sub piece 38 is fixed on a bicycle 100. As shown in FIG. 10A, the main body 20 is separate from the detachable sub piece 38 when the main body 20 is coupled to the pedal 110 by the engagement member 30. In comparison, as shown in FIG. 10B, when the main body 20 is not coupled to the pedal 110, the main body 20 may be connected with the detachable sub piece 38 that may be fixed on any position of the bicycle 100.

Figure 11:
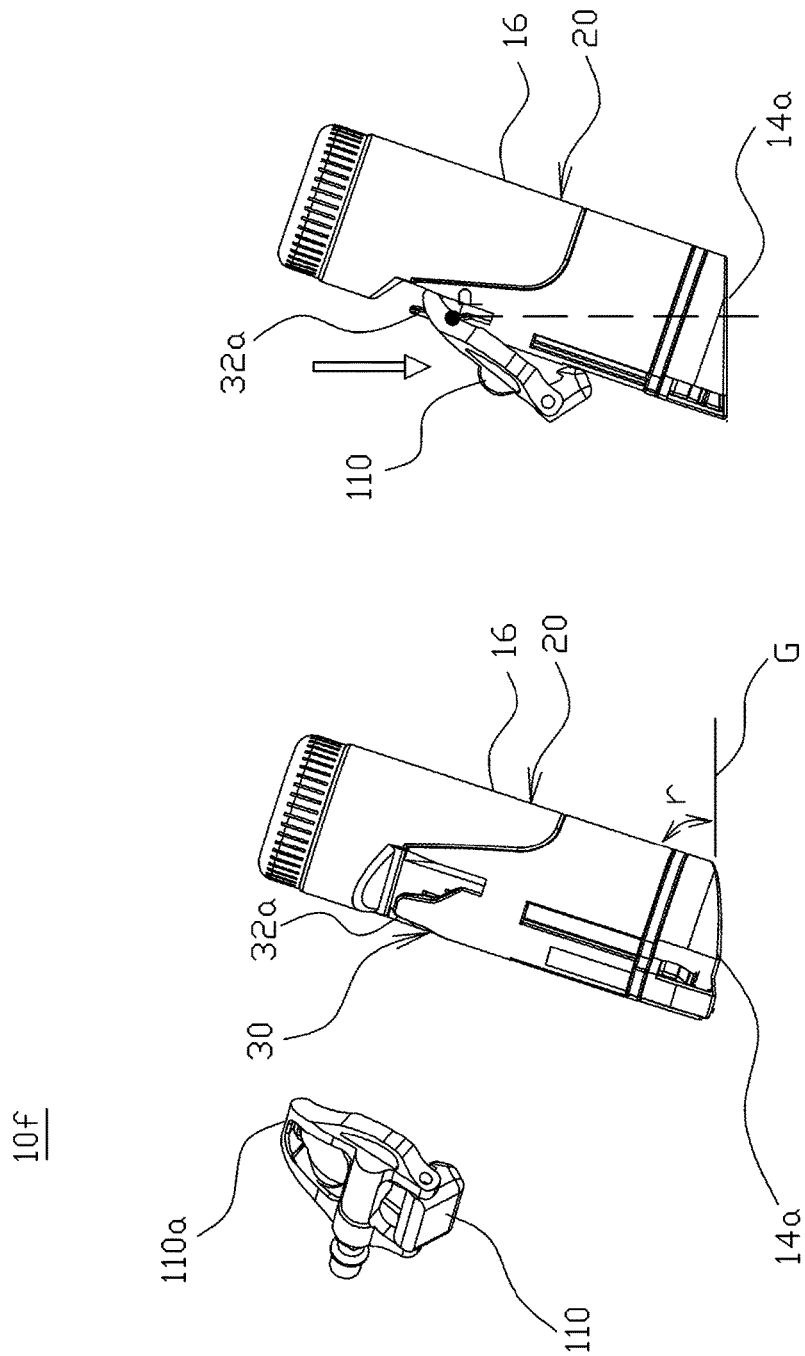
FIG. 11 shows a schematic diagram illustrating a bicycle container coupled to a pedal according to another embodiment of the invention.

FIG. 11 shows a schematic diagram illustrating a bicycle container coupled to a pedal according to another embodiment of the invention. In this embodiment, a bicycle container 10f has a main body 20 and an engagement member 30. The main body 20 has a side wall 16 and a bottom surface 14a connected to the side wall 16, and the bottom surface 14a is not perpendicular to the side wall 16. The engagement member 30 is provided on the side wall 16 of the main body 20 to engage with a pedal 110. The engagement member 30 may have a hook structure 32a, and a side end 110a of the pedal 110 may grip the hook structure 32a of the engagement member 30 to enable the bicycle container 10f to function as a bicycle stand. Therefore, an additional bicycle stand is longer needed. Besides, in this embodiment, the bottom surface 14a is not perpendicular to the side wall 16, at least a part of the bottom surface 14a may touch the ground G to support the pedal 110, and the side wall 16 may obliquely stand on the ground G when a bicycle is hold in an upright position. That is, the side wall 16 may make an angle γ not a right angle with respect to the ground G. As shown in FIG. 11, when the pedal 110 engages with the engagement member 30, the pedal 110 may exert a force to the main body 20 through at least one point P, and the point P overlaps the bottom surface 14a (i.e., a vertically extension line passing through the point P may cross the bottom surface 14a). Under the circumstance, the force exerted by the pedal 110 through the point P is applied to the inside of the bottom surface 14a but not outside of the bottom surface 14a to increase the stability of a parked state of a bicycle. Further, the design that the bottom surface 14a is not perpendicular to the side wall 16 may increase the bottom surface area touching the ground G to further increase standing stability.

Figure 12:
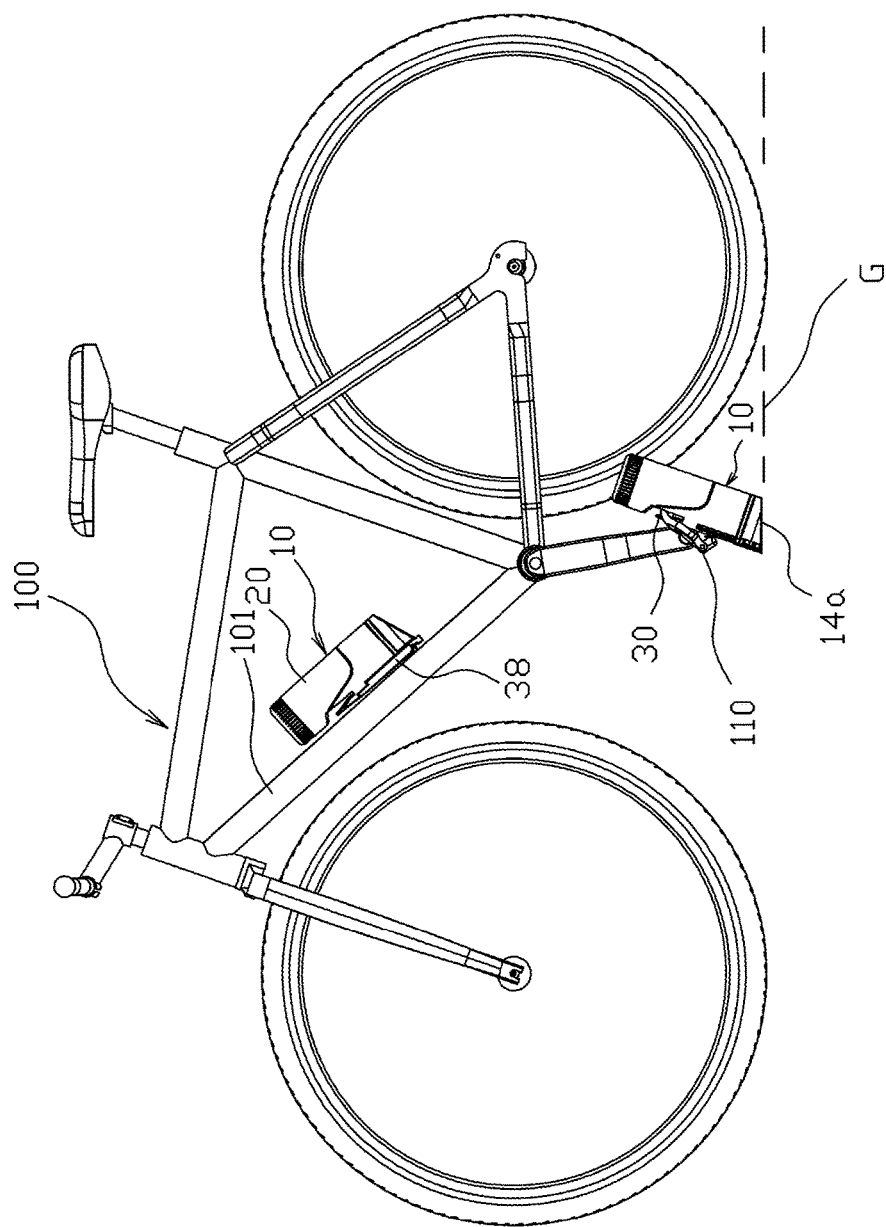
FIG. 12 shows a schematic diagram illustrating the positions of a bicycle container in or not in a parked state according to an embodiment of the invention.

FIG. 12 shows a schematic diagram illustrating the positions of a bicycle container in or not in a parked state according to an embodiment of the invention. As shown in FIG. 12, when the bicycle is hold in an upright position, the engagement member 30 of a bicycle container 10 may engage with a pedal 110 to allow the bicycle container 10 to be detachably coupled to the pedal 110 to park a bicycle 100. When the bicycle 100 is not in a parked state, the bicycle container 10 may be fixed on a bicycle tube 101 or other position. The bicycle container 10 may be fixed on the bicycle tube 101 in various ways. In one embodiment, a detachable sub piece 38 may be fixed on the bicycle 100 first, and the main body 20 of the bicycle container 10 may be combined with the detachable sub piece 38 to attach the bicycle container 10 to the bicycle 100.

Note, in the above embodiments where the bottom surface 14a is not perpendicular to the side wall 16 or the side wall 16 obliquely stands on the ground G, the shape and structure of the engagement member 30 are not limited. The engagement member 30 shown in FIG. 11 is merely for exemplary purposes. Further, the obliquely standing side wall 16 may enhance the parking stability of a bicycle container, even the bottom surface 14a of the main body 20 does not fully touch the ground G. For example, the bottom surface 14a may be provided with protrusions or angular portions serving stable supporting points and may not entirely touch the ground G.

Figure 13:
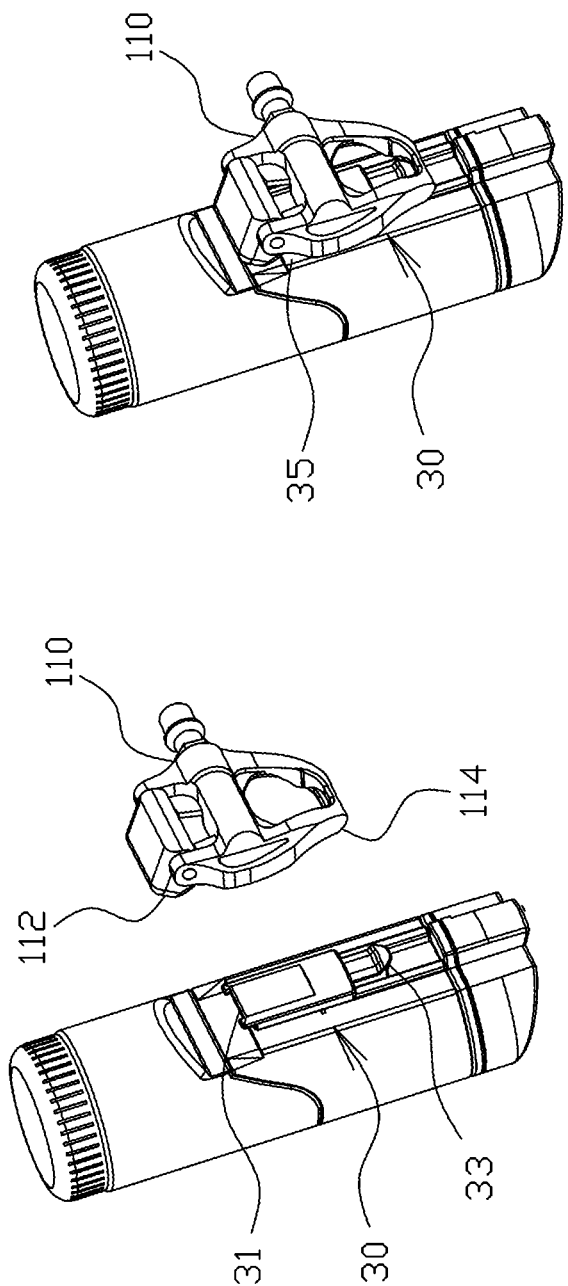
FIG. 13 shows a schematic diagram illustrating a bicycle container coupled to a pedal according to another embodiment of the invention.

FIG. 13 shows a schematic diagram illustrating a bicycle container coupled to a pedal according to another embodiment of the invention. The bicycle container may be coupled to a pedal in various ways without limitations. As shown in FIG. 13, the engagement member 30 has a clip portion 31 and a hook portion 33, a top end 112 of the pedal 110 may grip the clip portion 31, and a bottom end 114g of the pedal 110 may optionally grip the hook portion 33 of the bicycle container 10. The hook portion 33 may be an elastic member capable of adjusting a position of the pedal 110 relative to a bicycle container 10g when the pedal 110 is coupled to the bicycle container 10g. In an alternate embodiment, as shown in FIG. 14, the engagement member 30 of a bicycle container 10h may have a slot 35, and the pedal 110 is inserted into the slot 35 to be coupled to the bicycle container 10h.

In one embodiment, as shown in FIG. 1B, a vertical line Y passes through the center of circle C of a crank 11 and is perpendicular to the ground, and a horizontal line X passes through the center of circle C of the crank 11 and is parallel to the ground. The horizontal line X crosses the vertical line Y to define four zones, and the lower right zone corresponding to a rear wheel is regarded as a safe parking zone SF. When a bicycle container 10 is coupled to the pedal 110, the crank 11 may be disposed to locate in the safe parking zone SF and not to exceed the vertical line Y to further increase the parking stability. Further, in one embodiment, various anti-slip products may be used, such as a robber sheet or a rubber bottom plate, and may be applied between the bottom of a bicycle container and the ground.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A bicycle container comprising a main body for containing objects and a hook structure being configured to engage with a pedal of a bicycle to enable the bicycle container to be detachably coupled to the pedal to hold the bicycle in an upright position, wherein the main body has a top portion, a bottom portion and a side wall connected between the top portion and the bottom portion, the hook structure has a first part and a second part connected with the first part, the first part protrudes from the side wall, the second part makes an angle with the first part and extends in a direction substantially parallel to the side wall, and wherein the side wall, the first part and the second part together define a slot concave towards the bottom portion of the main body, and the second part of the hook structure prevents one end of the pedal staying in the slot from slipping off from the main body.

2. The bicycle container as claimed in claim 1, further comprising:
   at least one annular ring inserted onto the main body to fix the hook structure on the main body.

3. The bicycle container as claimed in claim 1, further comprising:
   a plurality of annular rings, and at least one of the annular ring clamping a brake lever of the bicycle to function as an auxiliary brake ring.

4. The bicycle container as claimed in claim 1, further comprising a clip portion formed on the main body and grips the pedal.

5. The bicycle container as claimed in claim 1, wherein the bicycle container is a bicycle kettle, a bike water bottle, a tool bottle, or a kettle-shaped tool bag.

6. The bicycle container as claimed in claim 1, wherein the bottom portion comprises a bottom surface, the pedal engaged with the bicycle container exerting a force on the bicycle container through at least one point, and the at least one point overlapping the bottom surface.

7. The bicycle container as claimed in claim 6, wherein at least a part of the bottom surface touches the ground.

8. The bicycle container as claimed in claim 6, wherein the side wall is not perpendicular to the bottom surface.

9. The bicycle container as claimed in claim 6, wherein the bicycle container is a bicycle kettle, a bike water bottle, a tool bottle, or a kettle-shaped tool bag.

10. The bicycle container as claimed in claim 1, wherein the side wall obliquely stands on the ground.

11. The bicycle container as claimed in claim 10, wherein the bicycle container is a bicycle kettle, a bike water bottle, a tool bottle, or a kettle-shaped tool bag.

* * * * *